US010432068B2

(12) United States Patent
Kim

(10) Patent No.: US 10,432,068 B2
(45) Date of Patent: Oct. 1, 2019

(54) SENSING UNIT AND MOTOR USING THE SAME

(71) Applicant: LG Innotek Co., Ltd., Seoul (KR)

(72) Inventor: Jung Keun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 191 days.

(21) Appl. No.: 15/092,888

(22) Filed: Apr. 7, 2016

(65) Prior Publication Data
US 2016/0301288 A1 Oct. 13, 2016

(30) Foreign Application Priority Data

Apr. 7, 2015 (KR) .................. 10-2015-0049106

(51) Int. Cl.
H02K 11/21 (2016.01)
H02K 11/215 (2016.01)
G01B 7/30 (2006.01)
B62D 5/04 (2006.01)
G01D 5/14 (2006.01)
G01D 5/20 (2006.01)
H02K 7/00 (2006.01)

(52) U.S. Cl.
CPC ............ *H02K 11/215* (2016.01); *G01B 7/30* (2013.01); *B62D 5/0463* (2013.01); *G01D 5/142* (2013.01); *G01D 5/145* (2013.01); *G01D 5/20* (2013.01); *H02K 7/003* (2013.01)

(58) Field of Classification Search
CPC .......... H02K 1/28; H02K 5/22; H02K 5/225; H02K 11/001; H02K 11/0015; H02K 11/0021; H02K 11/0031; H02K 29/03; H02K 29/06

USPC ............ 310/66, 67 R, 68 B, 68 D, 68 R, 71; 324/173, 174, 207.25
See application file for complete search history.

(56) References Cited

U.S. PATENT DOCUMENTS

| 5,103,170 A | * | 4/1992 | Grillo | G01P 1/00 324/173 |
| 5,757,180 A | * | 5/1998 | Chou | G01D 5/145 324/207.2 |
| 6,531,799 B1 | * | 3/2003 | Miller | H02K 21/046 310/112 |
| 7,573,259 B1 | * | 8/2009 | Kreger | G01D 5/145 324/207.22 |
| 8,237,318 B2 | * | 8/2012 | Ikitake | H02K 11/33 310/156.05 |
| 9,360,295 B2 | * | 6/2016 | Taniguchi | G01D 5/145 |

(Continued)

FOREIGN PATENT DOCUMENTS

KR 10-2012-0117293 A 10/2012
KR 10-2013-0012446 A 2/2013

*Primary Examiner* — Julio C. Gonzalez
*Assistant Examiner* — Rashad H Johnson
(74) *Attorney, Agent, or Firm* — Saliwanchik, Lloyd & Eisenschenk

(57) ABSTRACT

A structure of a motor which is capable of enhancing a sensing efficiency and a structural reliability is provided. Particularly, a sensing unit for a motor and a motor including the sensing unit which has a rotating shaft, a sensing plate press-fitted in a structure of passing through the rotating shaft, a sensing magnet disposed on the sensing plate, and a fixing plate coupled to a center of the rotating shaft by a coupling member and disposed in a structure of covering an exposed surface of the sensing magnet.

9 Claims, 6 Drawing Sheets

(56) References Cited

U.S. PATENT DOCUMENTS

| | | | | |
|---|---|---|---|---|
| 2006/0250127 | A1* | 11/2006 | Kayao | G01D 5/14 |
| | | | | 324/207.22 |
| 2007/0029995 | A1* | 2/2007 | Ichiman | F16C 33/7869 |
| | | | | 324/174 |
| 2008/0211332 | A1* | 9/2008 | Kataoka | H02K 3/522 |
| | | | | 310/71 |
| 2008/0211357 | A1* | 9/2008 | Kataoka | H02K 11/215 |
| | | | | 310/68 B |
| 2008/0252286 | A1* | 10/2008 | Kottmyer | G01D 5/2451 |
| | | | | 324/207.25 |
| 2009/0134730 | A1* | 5/2009 | Kurokawa | H02K 3/47 |
| | | | | 310/156.37 |
| 2010/0289442 | A1* | 11/2010 | Hatano | H02K 29/08 |
| | | | | 318/400.38 |
| 2013/0020916 | A1* | 1/2013 | Kim | H02K 29/08 |
| | | | | 310/68 B |
| 2013/0200888 | A1* | 8/2013 | Kim | G01B 7/30 |
| | | | | 324/207.25 |

\* cited by examiner

SENSING UNIT AND MOTOR USING THE SAME

CROSS-REFERENCE TO RELATED APPLICATION

This application claims the benefit under 35 U.S.C. § 119 of Korean Patent Application No. 10-2015-0049106, filed Apr. 7, 2015, which is hereby incorporated by reference in its entirety.

BACKGROUND

Technical Field

The present invention relates to a structure of a motor capable of enhancing sensing efficiency and structural reliability.

Discussion of Related Art

Generally, an electronic power steering system (EPS) is used to ensure steering stability of vehicles. The EPS enables a driver to drive safely by ensuring a cornering stability and providing quick restoring force of the steering since an electronic control unit drives a motor according to driving conditions sensed from a vehicle speed sensor, torque angle sensor, torque sensor, and the like. The EPS enables the driver to perform a steering work with less power as the motor assists the torque of a steering wheel that the driver operates, for which a brushless direct current motor (BLCD motor) is used. Major portion of the BLCD motor is formed by a stator and a rotor, in which a rotator wound by a coil and a stator coupled with a magnet interact with each other electromagnetically to rotate the rotor.

The EPS motor is controlled by exchanging information through a signal (hall device) with a sensing magnet. Generally, a sensing plate assembly made by a bonding coupling of a plate with a magnet using an adhesive is coupled to a rotating shaft for the sensing magnet to be coupled with the rotor, to maintain a pole pitch with a drive magnet, and to maintain a gap with a hall sensor. However, such a coupling structure of coupling the sensing magnet with the sensing plate using the adhesive may cause a trouble in drive due to a phenomenon such as separation between the magnet and the plate or separation between the sensing plate and the rotating shaft by a temperature environment, a mechanical stress deviation, an external force, or the like.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

SUMMARY OF THE INVENTION

Figure 1:
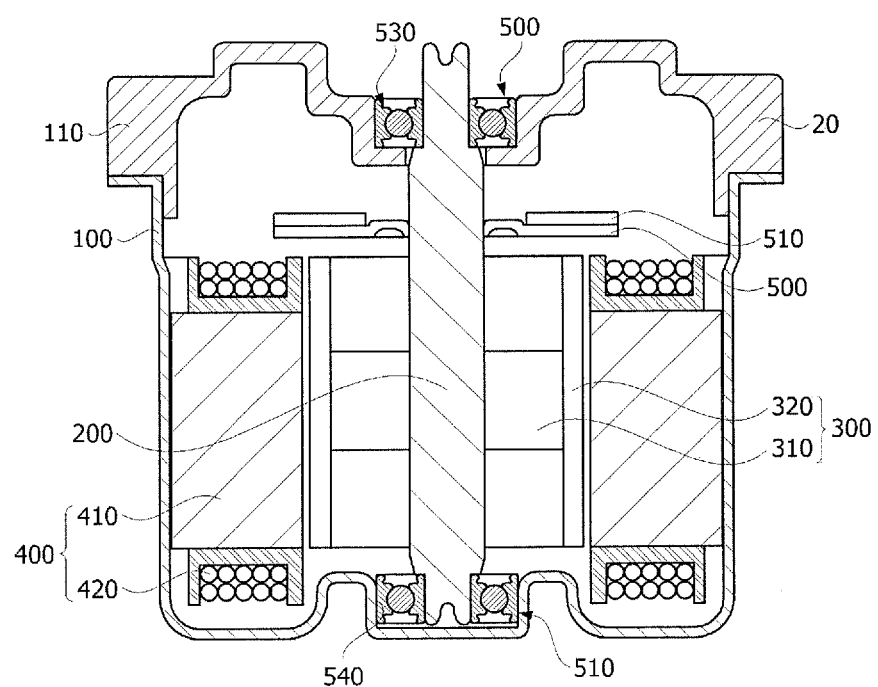
FIG. 1 is a cross-sectional conceptual diagram illustrating a structure of a motor including a sensing unit for a motor according to an embodiment of the present invention.

The present invention is directed to providing enhanced structural reliability of a motor resolving a separation problem due to abnormal bonding according to external environment and enhancing fixing properties of a sensing plate itself, particularly by directly fixing the sensing plate and a sensing magnet which are coupled to a rotating shaft to the rotating shaft using a fixing plate member which implement pressurizing in a direction from the outside toward the rotating shaft.

One aspect of the present invention provides a sensing unit for a motor which includes a rotating shaft, a sensing plate press-fitted in a structure of passing through the rotating shaft, a sensing magnet disposed on the sensing plate, and a fixing plate coupled to a center of the rotating shaft by a coupling member and is disposed in a structure of covering an exposed surface of the sensing magnet.

Another aspect of the present invention provides a motor in a structure including a motor housing, a rotating shaft which passes through the center of the motor housing, a rotor fixed to the rotating shaft, a stator which is fixed to an inner circumferential surface of the motor housing and rotates the rotating shaft by interacting with the rotor when electric power is applied, and a sensing unit which is press-fitted to the rotating shaft and senses a rotor position angle according to the above-described embodiment.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Figure 2:
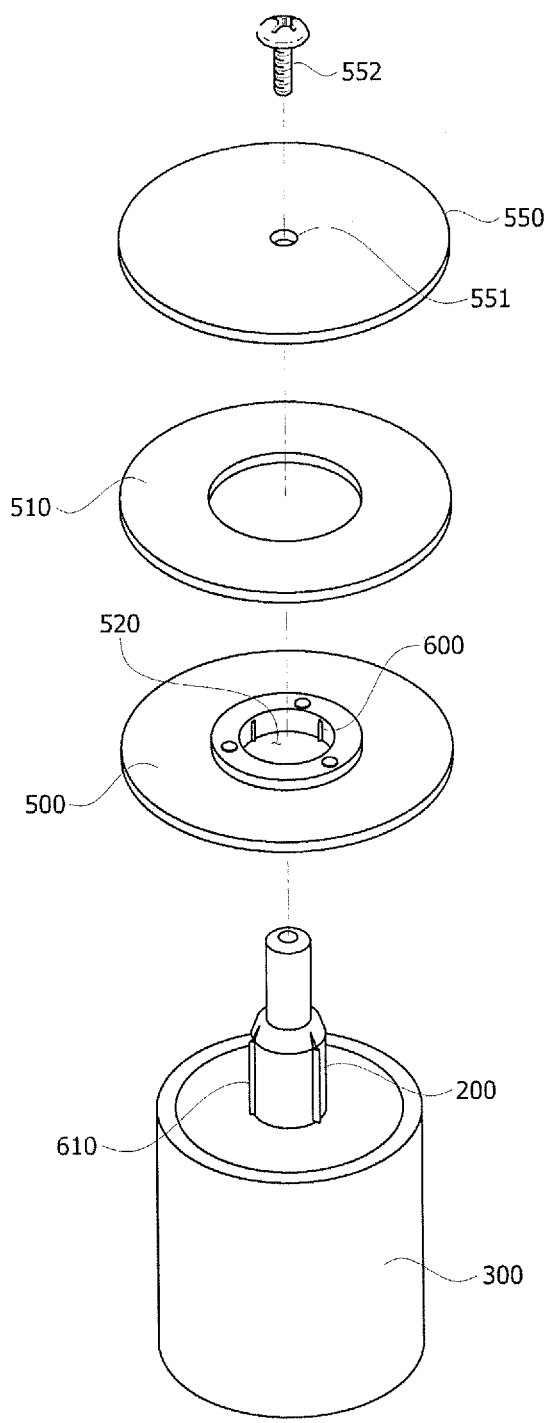
FIG. 2 is an exploded perspective view to describe a structure of the sensing unit for the motor according to an embodiment of the present invention of FIG. 1. In the present embodiment, an example of applying above-described sensing unit to an EPS motor will be taken for description.

FIG. 1 is a cross-sectional conceptual diagram illustrating a structure of a motor including a sensing unit for a motor according to an embodiment of the present invention, and FIG. 2 is an exploded perspective view to describe a structure of the sensing unit for the motor according to the embodiment of the present invention of FIG. 1. In the present embodiment, an example of applying above-described sensing unit to an EPS motor will be taken for description.

Referring to FIGS. 1 and 2, a structure of the EPS motor is formed, as illustrated in FIG. 1, including a motor housing 100, a rotating shaft 200 that passes through a center of the motor housing, a rotor 300 fixed to the rotating shaft, and a stator 400 fixed to an inner circumferential surface of the motor housing 100 and is configured to rotate the rotating shaft 200 by interacting with the rotor when electric power is applied. Particularly in this case, the structure of the EPS motor is formed to further include a sensing unit 500 and 510 which is press-fitted into the rotating shaft and senses a position angle of the rotor. The sensing unit 500 includes a structure having a sensing magnet 510 which is press-fitted into the rotating shaft to sense a position angle of the rotor, and a sensing plate 500 to which the sensing magnet is attached and is press-fitted into the rotating shaft.

Particularly, the sensing unit according to the embodiment of the present invention, as a structure illustrated in FIG. 2, includes a sensing plate 500 having a through hole 520 which couples to the rotating shaft 200 which passes through the rotor 300 and protrudes therefrom, a sensing magnet 510 disposed on the sensing plate, and a fixing plate 550 disposed on the upper portion of the sensing magnet and is press-fitted into the rotating shaft 200 by a fixing member 552.

That is, the fixing plate 550 is coupled not in a structure of being bonded to the sensing magnet by an adhesive, but is coupled to a center of the rotating shaft as an independent coupling member 552 is inserted thereto and is coupled by a fixing method of strongly pressurizing an exposed surface of the sensing plate. Various structures such as a fixing fin or a screw may be applied as the fixing member 552, and in the case of using the fixing member such as the screw or the like, it is necessary to implement a direction of screw thread to be against a rotating direction of the motor to prevent the coupling member from being separated due to the rotation.

Figure 3:
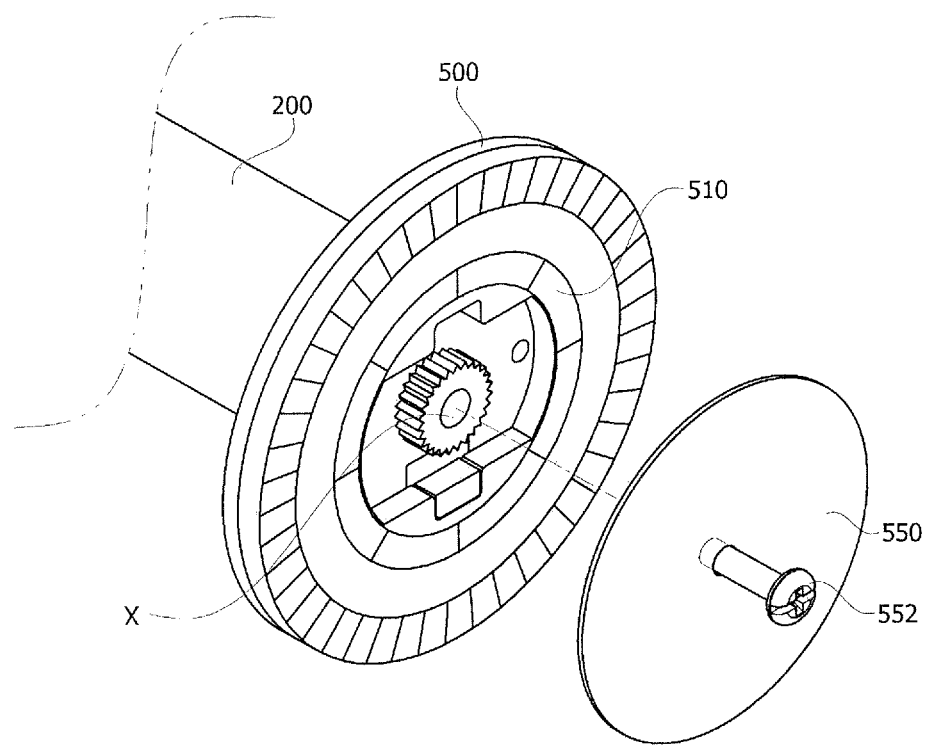
FIGS. 3 and 4 are conceptual diagrams illustrating a fixing structure of the sensing unit according to an embodiment of the present invention.
Figure 4:
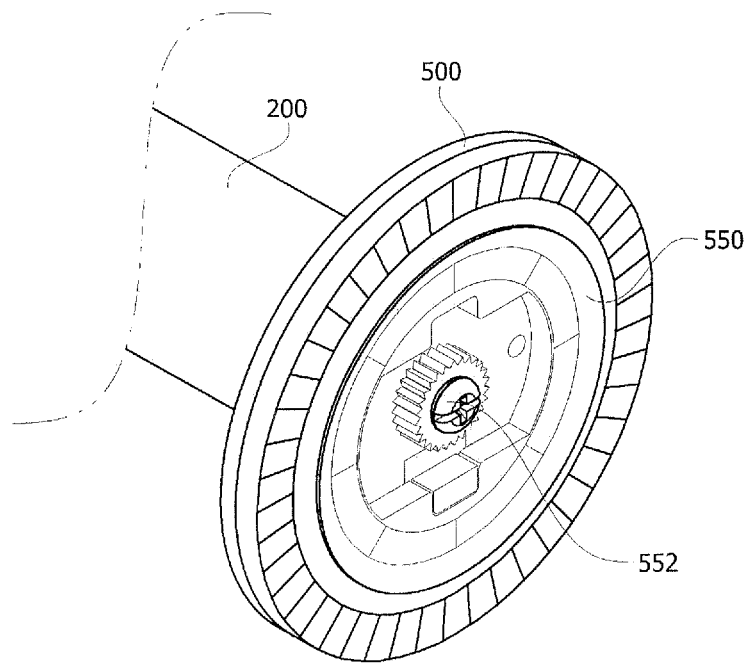

FIGS. 3 and 4 are an enlarged view of the coupling structure of FIG. 2.

That is, as illustrated in FIG. 3, an inserting hole X in which the coupling member 552 to be inserted is provided in the center of the rotating shaft 200. In addition, the fixing plate 550 which is disposed in a structure of covering the sensing magnet 510 on the sensing plate 500 is strongly coupled with the sensing plate by the coupling member 552.

FIG. 4 is a view illustrating the structure in which the coupling is completed.

As illustrated, since the fixing plate 550 exhibits a fixing force in a structure of covering an entire exposed surface of the sensing magnet 510, the fixing plate 550 not only serves as the function of protecting the sensing magnet 510 from external environment or a foreign material but also stably prevent the sensing magnet 510 from being separated. Further, it is preferable that the fixing plate 550 be implemented by a nonmagnetic material so as not to degrade a sensing efficiency of the sensing magnet.

Figure 5:
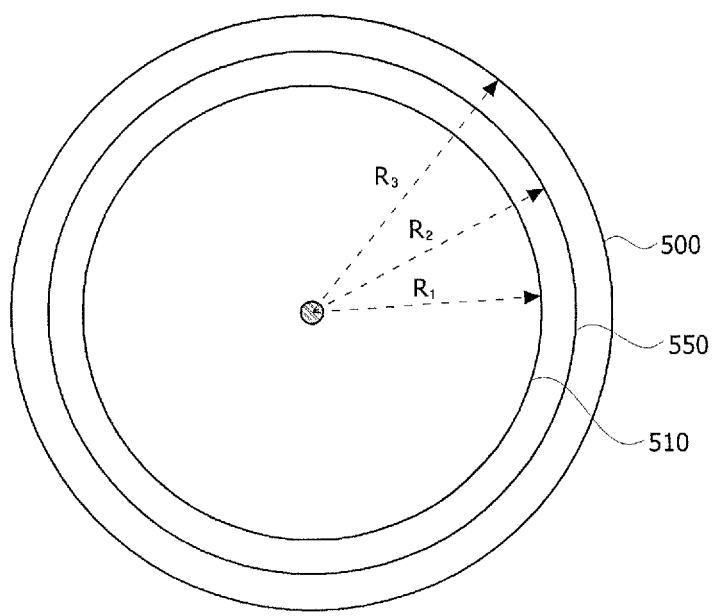
FIGS. 5 to 7 are views illustrating various modified embodiments of the sensing unit according to the embodiment of the present invention.

Particularly, referring to FIG. 5, the fixing plate 550 may be implemented to have the same appearance as the appearance of the sensing magnet, for example, as a circular shape (a disk shape), for corresponding to each other, to evenly pressurize the entire surface of the sensing magnet 510, and to have an area equal to or greater than the area of the sensing magnet to enhance a protective function. That is, a shape of a horizontal cross section of the fixing plate may be implemented as the same structure as the shape formed by an outer circumferential surface of the sensing magnet.

For instance, when considering a radius R1 of the sensing magnet and a radius R3 of the sensing plate based on a center of the rotating shaft (i.e. a coupling hole in which the coupling member is coupled), a radius R2 of the fixing plate is implemented to be greater than the radius R1 of the sensing magnet to protect the entire sensing magnet. That is, the fixing plate may have a width equal to or greater than a width of the outer circumferential surface of the sensing magnet based on the coupling member.

Figure 6A:
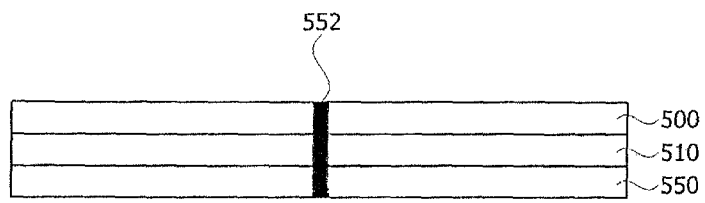
Figure 6B:
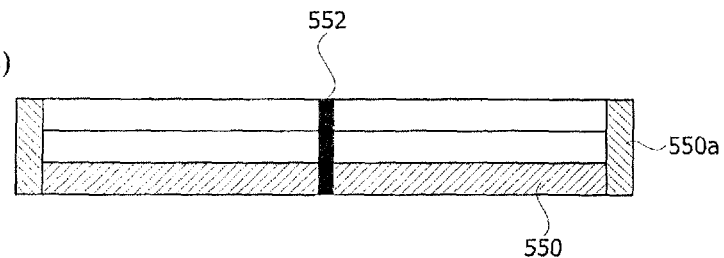
Figure 6C:
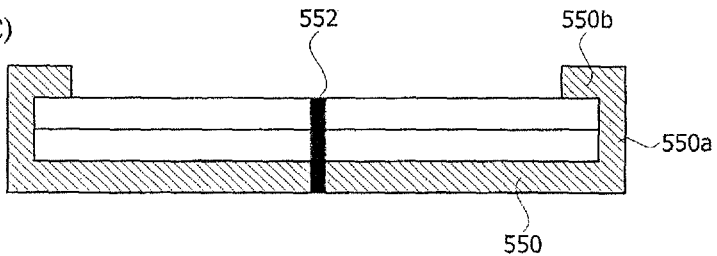

When the disposition relationship is conceptualized by FIG. 6(A)-FIG. 6(C), FIG. 6(A) is an exemplary diagram schematically illustrating the sensing plate 500, the sensing magnet 510, and the fixing plate 550 as described in FIGS. 4 and 5 to be fixed by the coupling member 552. As illustrated, the fixing plate 550 is configured to cover an entire area of the sensing magnet 510 to protect the entire sensing magnet 510.

In addition, to further secure a stable fixing force and protect the sensing magnet 510, as illustrated in FIG. 6(B), the structure of the fixing plate 550 may be implemented to further include a lateral surface projection 550a which makes a sealing contact with lateral surfaces of the sensing plate and the sensing magnet.

Further, as another embodiment, an end of the lateral surface projection 550a is implemented in a structure in which a bent portion 550b which is bent toward an upper surface of the sensing plate is provided so as to support the sensing plate, thereby the fixing plate may make a further strong contact to fix the sensing plate and the sensing magnet.

Figure 7:
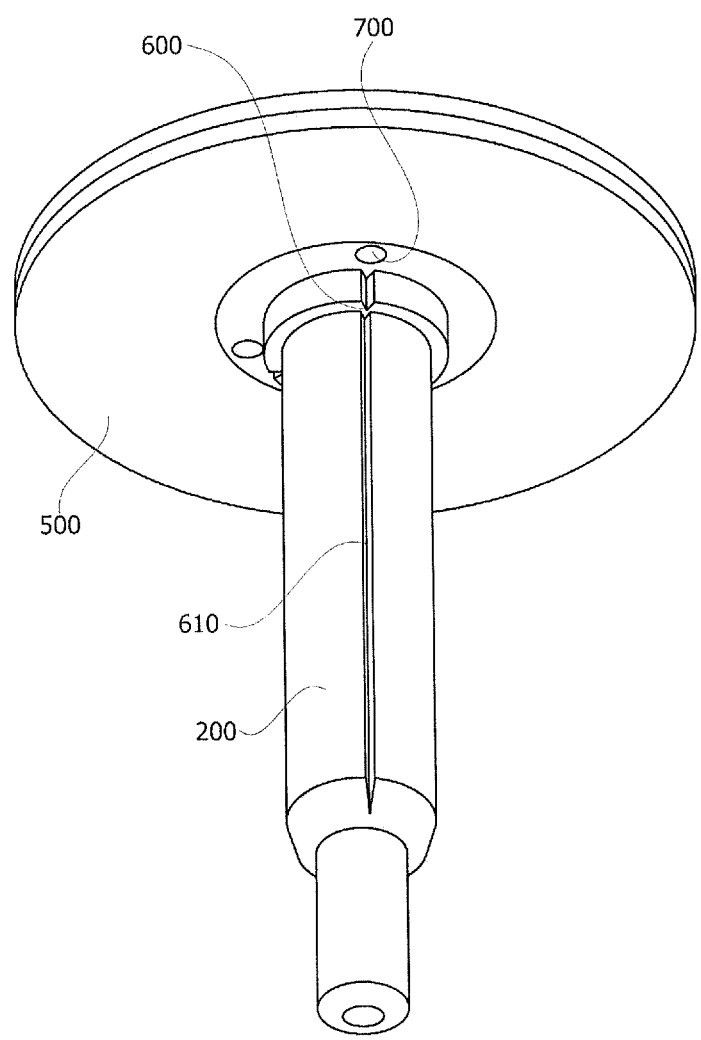

FIG. 7 illustrates an external structure of the sensing unit coupled to the rotating shaft 200 according to the embodiment of the present invention as shown in FIGS. 3 and 4.

Hereinafter, a structure and function of an electronic power steering system (EPS) motor to which a sensing unit according to the embodiments of the present invention is coupled will be described with reference to FIGS. 1, 3, and 7.

As illustrated, the EPS motor according to the embodiment of the present invention includes a motor housing 100 having a bracket coupled to an upper side thereof, a rotating shaft 200 rotatably supported at a center of the motor housing 100, a rotor 300 which is fixed to an outer circumferential surface of the rotating shaft 200 and rotates therewith, and a stator 400 which is fixed to an inner circumferential surface of the motor housing 100 and interacts with the rotor 300 to rotate the rotating shaft 200 when electric power is applied.

The motor housing 100 is formed in a substantially cylindrical shape in which an upper portion and a lower portion are opened respectively, thereby the stator 400 is hot-press-fitted to an inner circumferential surface. In addition, a bracket 110 may be installed at the opened upper surface of the motor housing 100.

The rotor 300 includes a rotor core 310 which is fixedly press-fitted to the outer circumferential surface of the rotating shaft 200, and a magnet 320 installed to an outer circumferential surface of the rotor core 310 in a circumferential direction. The stator 400 includes a stator core 410 press-fitted into the inner surface of the motor housing 100 and a coil 420 wound on the stator core 410.

In addition, a sensing plate 500 is press-fitted to the rotating shaft 200, a sensing magnet 510 which senses the position angle of the rotor 300 is disposed at the sensing plate 500, and the above-described fixing plate 550 is disposed on the upper portion of the sensing magnet 510, which are strongly pressurized to be coupled to the rotating shaft through a coupling member 552.

Further, a through hole 520 in which the rotating shaft 200 is inserted is formed at a center of the sensing plate 500, and at least one of an anti-slip projection 600 protruded toward an inner side direction may be formed at an inner surface of the through hole 520. An anti-slip groove 610 into which the anti-slip projection 600 is press-fitted may be formed in a longitudinal direction of the rotating shaft 200 at the outer circumferential surface of the rotating shaft 200. That is, when the rotating shaft 200 is press-fitted into the through hole 520 of the sensing plate 500, the anti-slip projection 600 is press-fitted into the anti-slip groove 610, thereby prevents the sensing plate 500 from slipping. Here, the anti-slip projection 600 may be formed in a polygonal shape such as a triangle shape, a tetragonal shape or the like, or in a semicircular shape or an elliptical shape. In addition, the anti-slip groove 610 as well may be formed in a polygonal shape such as a triangle shape, a tetragonal shape or the like, or in a semicircular shape or an elliptical shape.

As described above, in the coupling structure of the rotating shaft 200, sensing plate 500, and the fixing plate 550 according to the embodiment of the present invention, after aligning the anti-slip projection 600 formed at the sensing plate 500 with the anti-slip groove 610 formed at the rotating shaft 200, when the sensing plate 500 is press-fitted into the rotating shaft 200, the anti-slip projection 600 is press-fitted into the anti-slip groove 610, which enable the sensing magnet 510 to be aligned with a magnetization position and facilitate a convenient assembling. Further, since the sensing magnet is strongly fixed to the sensing plate 500 by the fixing plate, the sensing magnet is stably magnetized without using an adhesive.

In addition, the EPS motor performs not one-way rotation but two-way rotation, and the rotational direction is switched in a short period of time, in this case, since the rotating shaft 200 and the sensing plate 500 are assembled solidly each other, a slip of the sensing plate is prevented, and a separation of the sensing magnet or sensing plate according to rotation is prevented due to the coupling structure of the direct coupling to the rotating shaft through the fixing plate 550.

According to the embodiment of the present invention, since the sensing plate and the sensing magnet which are coupled to the rotating shaft are directly fixed to the rotating shaft using the fixing plate member which implements pressurizing in a direction from the outside toward the rotating shaft, a separation problem due to abnormal bonding according to external environment can be resolved and a fixing properties of the sensing plate itself can be enhanced, thereby having an effect of enhancing a structural reliability of the motor.

The detailed description of the present invention as described above has been described with reference to certain preferred embodiments thereof. However, various modifications may be made in the embodiments without departing from the scope of the present invention. The inventive concept of the present invention is not limited to the embodiments described above, but should be defined by the claims and equivalent scope thereof.

| Reference Numerals | |
|---|---|
| 100: MOTOR HOUSING | 110: BRACKET |
| 200: ROTATING SHAFT | 300: ROTOR |
| 310: ROTOR CORE | 320: MAGNET |
| 400: STATOR | 410: STATOR CORE |
| 420: COIL | 500: SENSING PL ATE |
| 510: SENSING MAGNET | 520: THROUGH HOLE |
| 550: FIXING PLATE | 552: COUPLING MEMBER |
| 600: ANTI-SLIP PROJECTION | 610: ANTI-SLIP GROOVE |

What is claimed is:

1. A sensing unit for a motor, comprising:
   a rotating shaft;
   a sensing plate press-fitted to a structure in which the sensing plate passes through the rotating shaft, wherein the sensing plate comprises a through hole and at least one anti-slip projection formed at and protruding from an inner surface of the through hole;
   a sensing magnet disposed on the sensing plate; and
   a fixing plate coupled to a center of the rotating shaft by a coupling member and disposed in a structure in which the fixing plate covers an exposed surface of the sensing magnet,
   wherein the fixing plate is coupled to the center of the rotating shaft when an exposed surface of the sensing plate is pressurized,
   wherein an outer radius of the sensing magnet is smaller than an outer radius of the fixing plate and the outer radius of the fixing plate is smaller than an outer radius of the sensing plate, and
   wherein the fixing plate is disposed to cover a top surface and an outer surface of the sensing magnet.

2. The sensing unit for a motor of claim 1, wherein the fixing plate has a width equal to or greater than a width of an outer circumferential surface of the sensing magnet.

3. The sensing unit for a motor of claim 2, wherein the fixing plate further includes a lateral surface projection which makes a sealing contact with lateral surfaces of the sensing plate and the sensing magnet.

4. The sensing unit for a motor of claim 3, wherein the fixing plate further includes a bent portion formed by bending an end of the lateral surface projection to support the sensing plate, and
   wherein the bent portion is disposed to cover a part of a lower surface of the sensing plate.

5. The sensing unit for a motor of claim 2, wherein the fixing plate is formed of nonmagnetic material.

6. The sensing unit for a motor of claim 5, wherein a shape of a horizontal cross section of the fixing plate is same as a shape of an outer circumferential surface of the sensing magnet.

7. A motor comprising:
   a motor housing;
   a rotating shaft which passes through a center of the motor housing and a rotor fixed to the rotating shaft;

a stator which is fixed to an inner circumferential surface of the motor housing and rotates the rotating shaft by interacting with the rotor when electric power is applied; and a sensing unit which is press-fitted to the rotating shaft and senses a rotor position angle, wherein the sensing unit includes:

a sensing plate press-fitted in a structure in which the sensing plate passes through the rotating shaft, wherein the sensing plate comprises a through hole and at least one anti-slip projection formed at and protruding from an inner surface of the through hole;

a sensing magnet disposed on the sensing plate; and a fixing plate which is coupled to a center of the rotating shaft by a coupling member and is disposed in the structure in which the fixing plate covers an exposed surface of the sensing magnet, wherein the fixing plate is coupled to the center of the rotating shaft when an exposed surface of the sensing plate is pressurized, wherein an outer radius of the sensing magnet is smaller than an outer radius of the fixing plate and the outer radius of the fixing plate is smaller than an outer radius of the sensing plate, and wherein the fixing plate is disposed to cover a top surface and an outer surface of the sensing magnet.

8. The motor of claim 7, wherein the fixing plate further includes a lateral surface projection which makes a sealing contact with lateral surfaces of the sensing plate and the sensing magnet.

9. The motor of claim 8, wherein the fixing plate further includes a bent portion formed by bending an end of the lateral surface projection to support the sensing plate, and wherein the bent portion is disposed to cover a part of a lower surface of the sensing plate.

* * * * *